May 1, 1934.    W. MESSINGER    1,956,648
HYDRAULIC SWIVEL FOR WELL DRILLING
Filed July 9, 1930
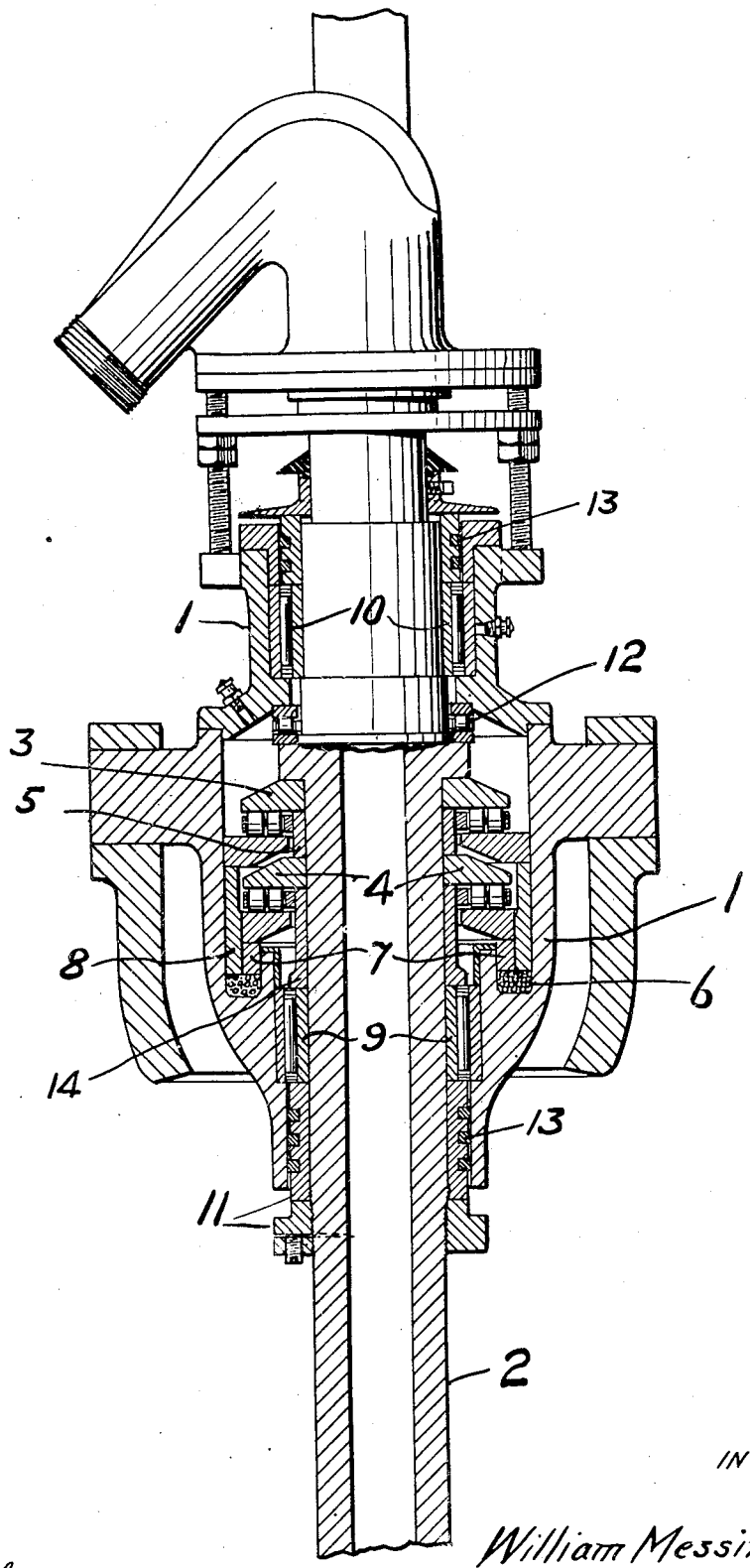
WITNESS:
Rob R Kitchel
INVENTOR
William Messinger
BY
Augustus B. Stoughton
ATTORNEY.

Patented May 1, 1934

1,956,648

UNITED STATES PATENT OFFICE 1,956,648

HYDRAULIC SWIVEL FOR WELL DRILLING

William Messinger, Philadelphia, Pa.

Application July 9, 1930, Serial No. 466,658

7 Claims. (Cl. 308—231)

Good design and practical requirements provide very little room between a suspended swivel housing and the rotating element which frequently is very heavy and the contracted space and the weight of the rotating element present a problem in the introduction of ball or roller thrust bearing suspension between the housing and the rotating element.

The principal object of the present invention is to provide efficient roller thrust bearing suspension between the housing and the rotating element and to insure correct alignment between the rotating element, the swivel housing and the thrust bearing suspension.

Generally stated, the invention comprises a plurality of thrust bearings interposed between the housing and the rotating element, a pocket in the housing containing or provided with a mixture of small balls and grease acting like a fluid, and supports interposed between the lower thrust plates of the bearings and the mixture and having surfaces of substantially the same area in contact with the mixture to divide the load evenly between the bearings.

The invention also comprises the improvements to be presently described and finally claimed.

In the following description reference will be made to the single figure of the drawing which is an elevational view principally in central section of a rotary hydraulic swivel embodying features of the invention.

In the accompanying drawing 1, generally, designates the swivel housing. 2 is the rotating element and it may comprise drills and well casings. There are two roller thrust bearings and in this description and in the claims the term roller thrust bearings is not intended to exclude ball thrust bearings. The upper plate 3 of the upper thrust bearing rests under a shoulder on the rotating element 2. The upper plate 4 of the lower thrust bearing is spaced from the plate 3 by a ring 5. Within the housing 1 there is provided an annular pocket 6, and in this pocket 6 is arranged a mixture of small balls and grease which acts like a fluid in respect to the transmission of pressure exerted upon it. 7 and 8 are nested sleeves in sliding relation. The sleeve 8 underlies and supports the bottom plate of the top bearing, and the sleeve 7 underlies and supports the bottom plate of the lower bearing. The area of the surfaces of the lower ends of each of these sleeves is the same and is seated upon the mixture of balls and grease such as vaseline in the pocket 6. 9 and 10 are journal roller bearings mounted on the rotating element and between it and the housing to insure correct alignment between the rotating element, the housing and the thrust bearings. The inner ring of the journal bearing 9 supports the ring 14 and is in turn supported by the parts 11 secured to the rotating element. 12 is a small auxiliary roller thrust bearing interposed between the housing 1 and the shoulder on the rotating element 2, and it serves to take up vertical slack or relative movement between the rotating element and the swivel housing, which has the beneficial result of obviating impacts and concussion of the roller bearing parts. 13 represents piston ring type seals and they effectually retain the lubricant in which the roller bearings are immersed, and they also exclude dirt and moisture.

The sleeves 7 and 8 are relatively movable and respectively support the bottom plates of the thrust bearings, and the area of the surfaces of the sleeves resting upon the mixture of balls and grease is equal, consequently the load reaction on the thrust bearings is equally divided. Therefore two thrust bearings of size that can be conveniently and practically assembled in the structure may be used. One advantage of the use of a mixture of balls and grease or vaseline is that leakage troubles are minimized while the full advantages of a fluid medium are attained.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces of equal area acting on the fluid medium, the bottom plates of the thrust bearings being movable in the suspended element of the swivel and supported by said supports, journal bearings interposed between the suspended and rotary elements of the swivel and insuring correct alignment between the rotary element and the suspended element and the thrust bearings, and a swivel roller thrust bearing arranged between the suspended element and a shoulder provided on the rotary element of the swivel.

2. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces of equal area acting on the fluid medium, the bottom plates of the thrust bearing being movable in the suspended element of the swivel and supported by said supports, and a small roller thrust bearing arranged between the suspended element and a shoulder provided on the rotating element of the swivel.

3. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces of equal area acting on the fluid medium, the bottom plates of the thrust bearings being movable in the suspended element of the swivel and supported by said supports, journal bearings interposed between the suspended and rotary elements of the swivel and insuring correct alignment between the rotary element and the suspended element and the thrust bearings, a swivel roller thrust bearing arranged between the suspended element and a shoulder provided on the rotary element of the swivel, and piston ring type packings arranged between the rotating and suspended elements of the swivel.

4. In a rotary hydraulic swivel for well drilling the combination of a plurality of superposed roller thrust bearings of which the top plates are fast on the rotating element of the swivel, a mixture of balls and grease contained in a pocket provided in the suspended element, movable nested sleeves in contacting relation serving to guide each other and supporting the bottom plates of the thrust bearings and coacting with said mixture, roller journal bearings interposed between the suspended and rotary elements of the swivel above and below said thrust bearings to ensure correct alignment between the rotary element and the suspended element and the thrust bearings, a swivel roller thrust bearing arranged between the suspended element and a shoulder provided on the rotary element of the swivel and within said journal bearings, and piston ring type packings arranged between the rotating and suspended elements of the swivel and outside of said journal bearings.

5. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces acting on the fluid medium, the bottom plates of the thrust bearings being movable in the suspended element of the swivel and supported by said supports, journal bearings interposed between the suspended and rotary elements of the swivel and insuring correct alignment between the rotary element and the suspended element and the thrust bearings, and a swivel roller thrust bearing arranged between the suspended element and a shoulder provided on the rotary element of the swivel.

6. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces acting on the fluid medium, the bottom plates of the thrust bearing being movable in the suspended element of the swivel and supported by said supports, and a small roller thrust bearing arranged between the suspended element and a shoulder provided on the rotating element of the swivel.

7. In a rotary hydraulic swivel for well drilling the combination of a plurality of superposed roller thrust bearings of which the top plates are fast on the rotating element of the swivel, a fluid medium, means confining the fluid medium, supports arranged in relatively sliding contacting engagement to serve as guides for each other and having surfaces acting on the fluid medium, the bottom plates of the thrust bearings being movable in the suspended element of the swivel and supported by said supports, journal bearings interposed between the suspended and rotary elements of the swivel and insuring correct alignment between the rotary element and the suspended element and the thrust bearings, a swivel roller thrust bearing arranged between the suspended element and a shoulder provided on the rotary element of the swivel, and piston ring type packings arranged between the rotating and suspended elements of the swivel.

WILLIAM MESSINGER.